United States Patent
Kinoshita

(10) Patent No.: US 9,074,949 B2
(45) Date of Patent: Jul. 7, 2015

(54) DIAGNOSTIC DEVICE FOR TEMPERATURE SENSOR

(71) Applicant: Fuji Jukogyo Kabushiki Kaisha, Tokyo (JP)

(72) Inventor: Takahiro Kinoshita, Tokyo (JP)

(73) Assignee: FUJI JUKAGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/097,084

(22) Filed: Dec. 4, 2013

(65) Prior Publication Data
US 2014/0185647 A1      Jul. 3, 2014

(30) Foreign Application Priority Data

Dec. 28, 2012 (JP) .................... 2012-286580
May 16, 2013 (JP) .................... 2013-104054

(51) Int. Cl.
G01K 15/00 (2006.01)

(52) U.S. Cl.
CPC .......... *G01K 15/007* (2013.01); *G01K 2205/00* (2013.01)

(58) Field of Classification Search
USPC ............................ 374/1, E15.001; 701/33.9
See application file for complete search history.

(56) References Cited

U.S. PATENT DOCUMENTS

| 7,203,617 B1 * | 4/2007 | Rahman et al. ............... 702/130 |
| 8,303,174 B2 * | 11/2012 | Kasahara ..................... 374/144 |
| 2006/0049691 A1 * | 3/2006 | Deprez et al. ................. 303/191 |
| 2006/0241841 A1 * | 10/2006 | Brunstetter ..................... 701/63 |

FOREIGN PATENT DOCUMENTS

| JP | 2004-011869 A | 1/2004 |
| JP | 2008-107089 A | 5/2008 |

* cited by examiner

*Primary Examiner* — Lisa Caputo
*Assistant Examiner* — Nasir U Ahmed
(74) *Attorney, Agent, or Firm* — McGinn IP Law Group, PLLC

(57) ABSTRACT

A diagnostic device for a temperature sensor is provided in a power transfer device that transfers drive power generated by a drive power source in a vehicle. The diagnostic device includes: a warm-up state determining unit to determine whether the drive power source is in a predetermined warm-up completion state; and a low temperature offset malfunction determining unit to determine a low temperature offset malfunction in the temperature sensor when the warm-up state determining unit determines that the warm-up completion state is established, and the detected value from the temperature sensor is lower than a predetermined low temperature threshold.

8 Claims, 7 Drawing Sheets

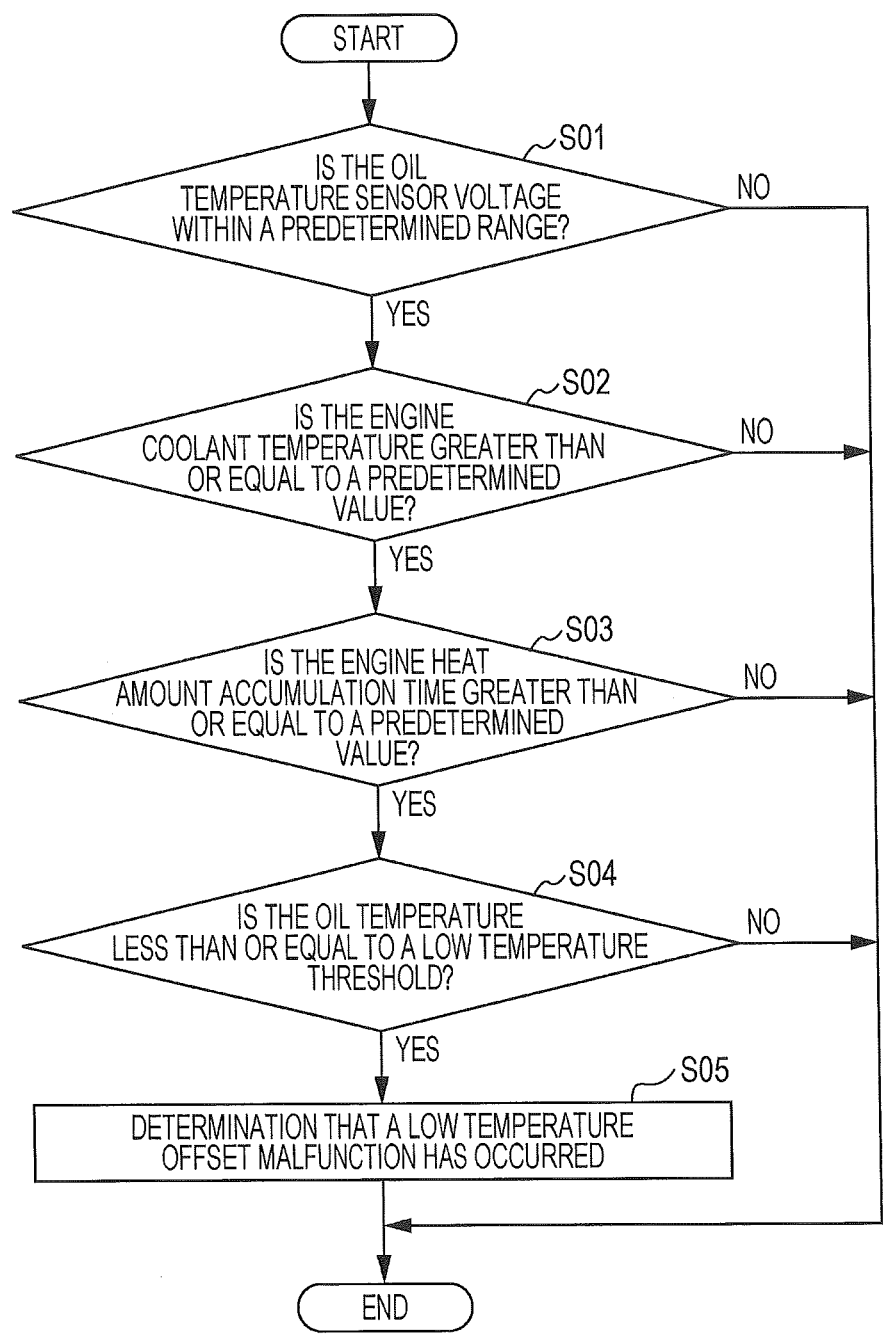

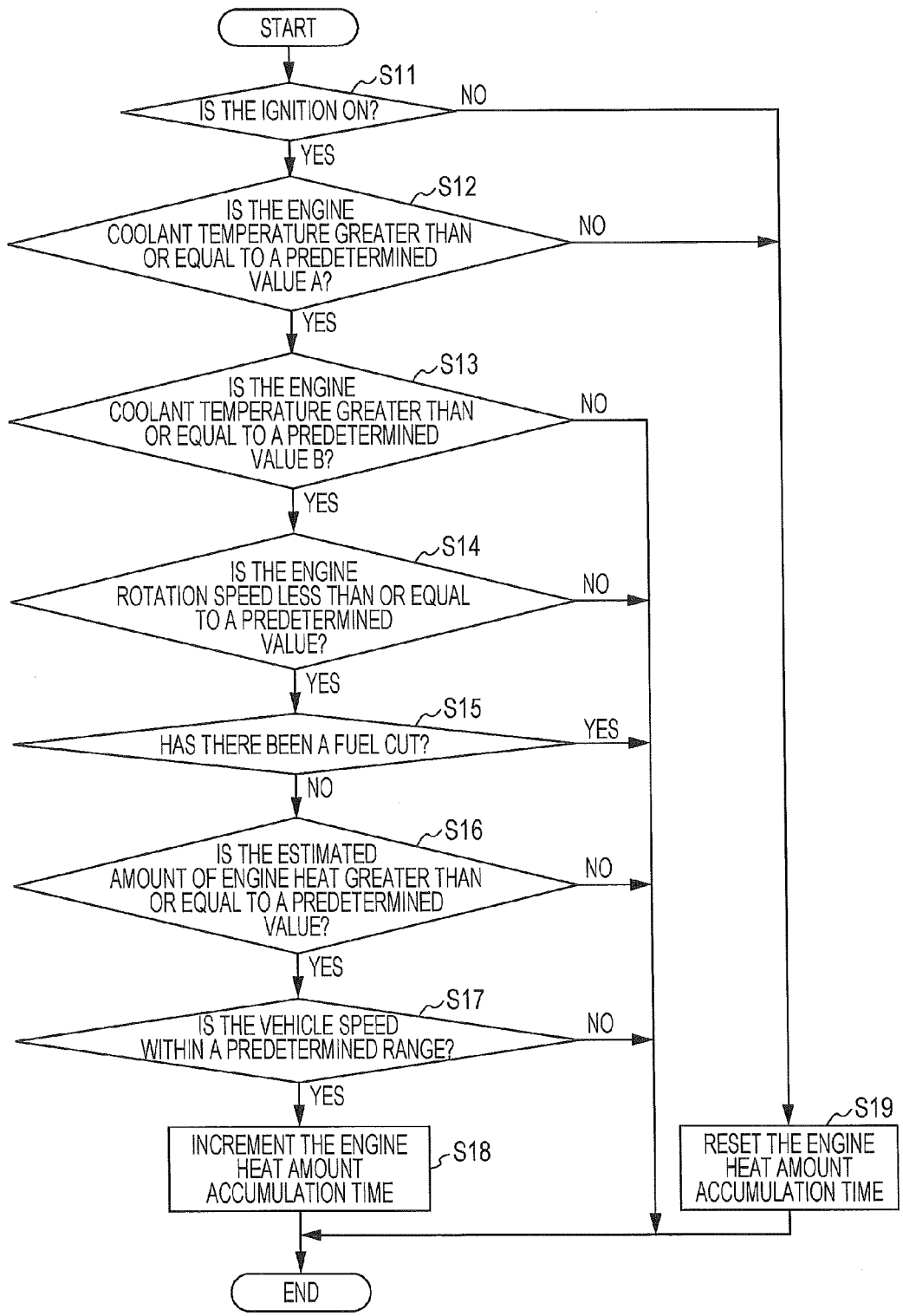

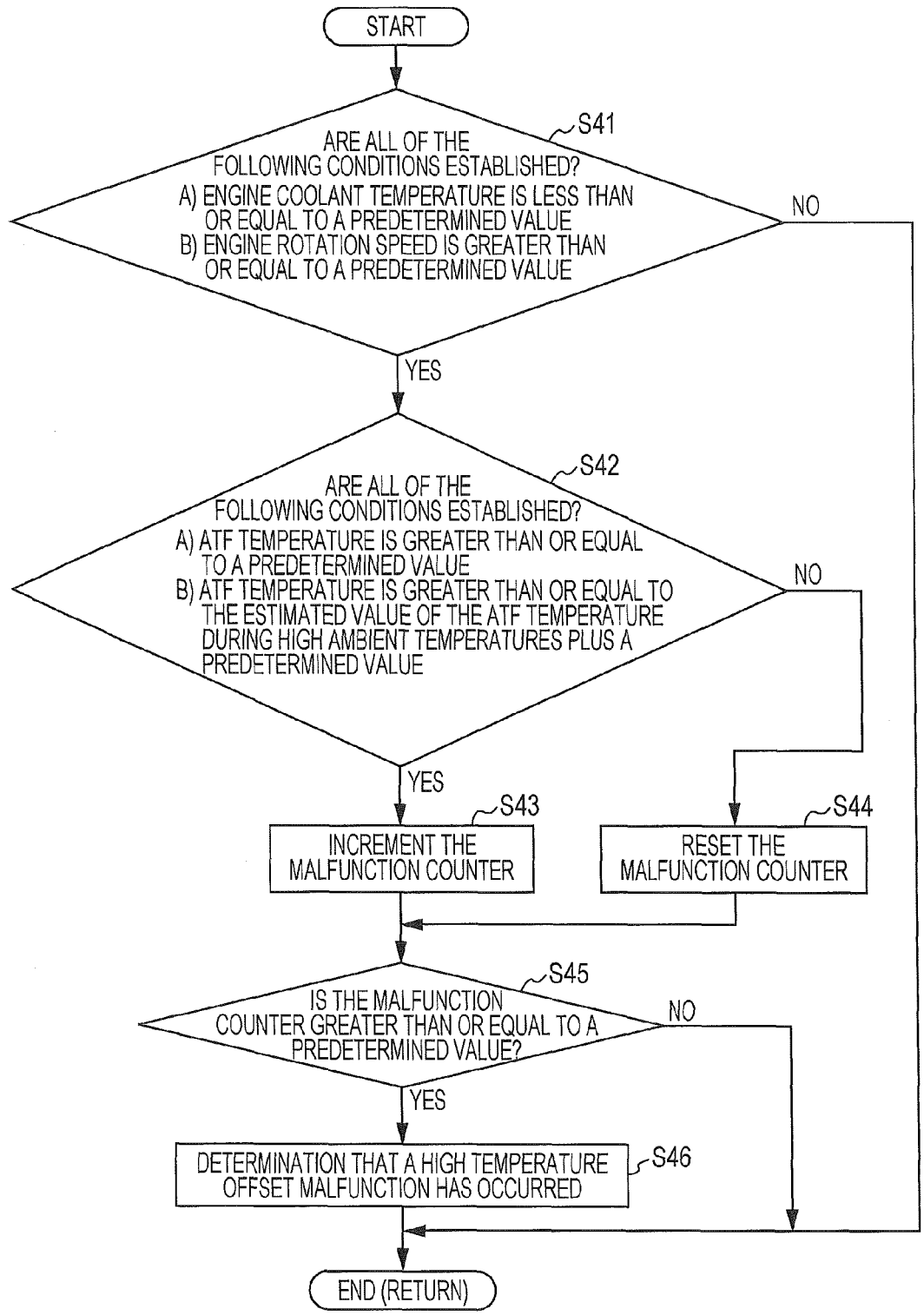

DIAGNOSTIC DEVICE FOR TEMPERATURE SENSOR

CROSS-REFERENCE TO RELATED APPLICATIONS

The present application claims priority from Japanese Patent Application Nos. 2012-286580 filed on Dec. 28, 2012 and 2013-104054 filed on May 16, 2013, the entire contents of which are hereby incorporated by reference.

BACKGROUND

1. Technical Field of the Invention

The present technology relates to diagnostic devices for a temperature sensor provided in an automobile transmission, for example, and in particular to a diagnostic device having a simple configuration that detects with high accuracy malfunctions in which a detected value by the temperature sensor is offset.

2. Related Art

Automatic transmissions for automobiles, for example, are provided with a temperature sensor for detecting the oil temperature of automatic transmission fluid that functions as hydraulic fluid and lubricant.

Since malfunctions in the temperature sensor may cause problems with control of the automatic transmission, various methods have been proposed for detecting malfunctions.

For example, a technique disclosed in Japanese Unexamined Patent Application Publication (JP-A) No. 2004-11869 discloses diagnoses malfunctions in an oil temperature sensor in that case where the ambient temperature of a vehicle and a detected value by the oil temperature sensor are compared and the detected value of the oil temperature is lower than the ambient temperature.

In addition, JP-A No. 2008-107089 discloses a technique to diagnose an occurrence of temperature drift for a thermocouple temperature sensor. The technique gives a weight which depends on temperature to the time of use at which the temperature drift may occur and diagnoses the occurrence of the temperature drift on the basis of a drift amount estimated from an additive value of this usage time after the weight has been added.

The diagnosis of malfunctions in temperature sensors having thermistors is comparatively easy when the output voltage is clearly outside a normal range, as with supply faults, ground faults, and wiring disconnects.

However, in the cases that, for example, the contact resistance is increased due to degradation of the connector fitting, a ground fault via contact resistance occurs due to interference with other metallic parts, which are a state similar to when resistance is applied to the sensor in series or in parallel, it is difficult to detect malfunctions despite the detected values being offset toward low temperatures or high temperatures as the actual output voltage is still within normal ranges.

SUMMARY OF THE INVENTION

It is an object of the present technology is to provide a diagnostic device for a temperature sensor having a simple configuration to detect with greater accuracy malfunctions in which the detected values from the temperature sensor are offset.

An aspect of the present technology provides a diagnostic device for a temperature sensor provided in a power transfer device that transfers drive power generated by a drive power source in a vehicle. The diagnostic device includes: a warm-up state determining unit to determine whether or not the drive power source is in a predetermined warm-up completion state; and a low temperature offset malfunction determining unit to determine a low temperature offset malfunction in the temperature sensor when the warm-up state determining unit determines that the warm-up completion state is established, and the detected value from the temperature sensor is lower than a predetermined low temperature threshold.

The warm-up state determining unit may determine the warm-up completion state when an accumulated time of a state in which an estimated heat amount from the drive power source is at or above a predetermined value is at or above a predetermined value.

The diagnostic device for a temperature sensor may further include: a high heat state determining unit to determine whether or not the drive power source is in a predetermined high heat state; and a high temperature offset malfunction determining unit to determine a high temperature offset malfunction in the temperature sensor when the high heat state determining unit determines that the high heat state is not established, and the detected value from the temperature sensor is higher than a predetermined high temperature threshold.

Another aspect of the present technology provides a diagnostic device for a temperature sensor provided in a power transfer device that transfers drive power generated by a drive power source in a vehicle. The diagnostic device includes: a high heat state determining unit to determine whether or not the drive power source is in a predetermined high heat state; and a high temperature offset malfunction determining unit to determine a high temperature offset malfunction in the temperature sensor when the high heat state determining unit determines that the high heat state is not established, and the detected value from the temperature sensor is higher than a predetermined high temperature threshold.

The high temperature offset malfunction determining unit may determine the high temperature offset malfunction when the high heat state determining unit determines that the high heat state is not established, and an accumulated time of a state in which the detected value from the temperature sensor is higher than the predetermined high temperature threshold is at or above a predetermined value.

Another aspect of the present technology provides a diagnostic device for a temperature sensor provided in a power transfer device that transfers drive power generated by a drive power source in a vehicle. The diagnostic device includes: a low ambient temperature temperature-estimating unit to calculate an estimated temperature of a measured object under conditions of predetermined low temperatures; and a low temperature offset malfunction determining unit to determine a low temperature offset malfunction in the temperature sensor when the estimated temperature calculated by the low ambient temperature temperature-estimating unit is at or above a predetermined value, and the actual value of the measured object detected by the temperature sensor is at or below a previously set low temperature offset malfunction determination value.

The low temperature offset malfunction determining unit may determine the low temperature offset malfunction when a state in which the actual value is at or below the low temperature offset malfunction determination value continues for at least a predetermined amount of time.

The diagnostic device for a temperature sensor may further include: a high ambient temperature temperature-estimating unit to calculate an estimated temperature of a measured object under conditions of predetermined high temperatures;

and a high temperature offset malfunction determining unit to determine the high temperature offset malfunction in the temperature sensor when the actual value of the measured object detected by the temperature sensor is at least a predetermined temperature higher than the estimated value calculated by the high ambient temperature temperature-estimating unit.

Another aspect of the present technology provides a diagnostic device for a temperature sensor provided in a power transfer device that transfers drive power generated by a drive power source in a vehicle. The diagnostic device includes: a high ambient temperature temperature-estimating unit to calculate an estimated temperature of a measured object under conditions of predetermined high temperatures; and a high temperature offset malfunction determining unit to determine the high temperature offset malfunction in the temperature sensor when the actual value of the measured object detected by the temperature sensor is at least a predetermined value higher than the estimated temperature calculated by the high ambient temperature temperature-estimating unit.

The high temperature offset malfunction determining unit may determine the high temperature offset malfunction when a state in which the actual value is at least a predetermined value higher than the estimated temperature calculated by the high ambient temperature temperature-estimating unit continues for at least a predetermined amount of time.

BRIEF DESCRIPTION OF THE DRAWINGS

FIG. 2A illustrates a low temperature offset malfunction when contact resistance is applied in series, and FIG. 2B illustrates a high temperature offset malfunction when contact resistance is applied in parallel.

FIG. 3 is a flowchart illustrating a method for diagnosing low temperature offset malfunctions regarding the diagnostic device for a temperature sensor according to the first example.

FIG. 4 is a flowchart illustrating a method for counting the engine heat amount accumulation time used for the low temperature offset malfunction diagnosis in FIG. 3.

FIG. 7 is a flowchart illustrating a method for diagnosing high temperature offset malfunctions regarding the diagnostic device for a temperature sensor according to the second example.

DETAILED DESCRIPTION

The present technology provides a diagnostic device for a temperature sensor having a simple configuration that detects with higher accuracy malfunctions in which the detected values by the temperature sensor are offset, by estimating the transmission warm-up state and temperature state from the engine operational state, etc., and using this information to compare with the detected values from the transmission oil temperature sensor to determine low temperature offset malfunctions and high temperature offset malfunctions when these detection values represent an abnormally high temperature or low temperature in comparison.

Also, the present technology provides a diagnostic device for a temperature sensor having a simple configuration that detects with higher accuracy malfunctions in which the detected values of the temperature sensor are offset, by determining a low temperature offset malfunction when a state in which the actual measured temperature is at or below a determination value continues for at least a predetermined amount of time despite the estimated temperature of the measured object during low ambient temperatures is at or over a predetermined value, and by determining a high temperature offset malfunction when a state in which the actual measured temperature is at or higher than a predetermined value and higher than the estimated temperature of the measure object during high ambient temperatures continues for at least a predetermined amount of time.

First Example

Hereafter, the diagnostic device for a temperature sensor according to a first example of the present technology will be described.

The diagnostic device for a temperature sensor according to the first example diagnoses low temperature offset malfunctions and high temperature offset malfunctions regarding the oil temperature sensor in automatic transmissions in passenger automobiles, for example.

Figure 1:
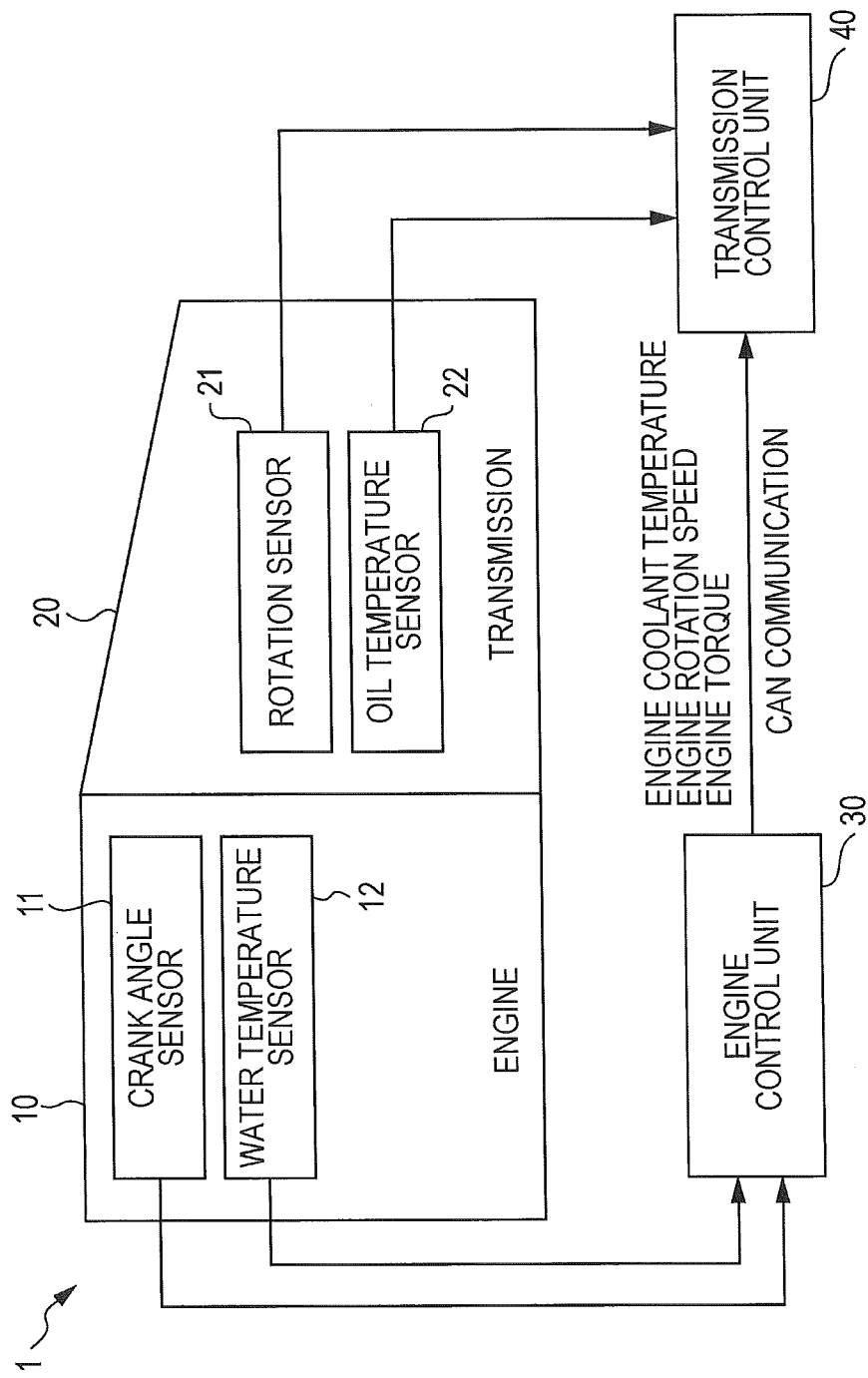
FIG. 1 is a schematic diagram illustrating a configuration of a vehicle powertrain including a diagnostic device for a temperature sensor according to a first example of the present technology.

FIG. 1 is a schematic diagram illustrating a configuration of a vehicle power train including the diagnostic device for a temperature sensor according to the first example.

As illustrated in FIG. 1, a power train 1 is configured with an engine 10, a transmission 20, an engine control unit 30, a transmission control unit 40, and others.

The engine 10 is an internal combustion engine such as a four-stroke gasoline engine or diesel engine, for example, used as the drive power source for vehicles.

The engine 10 is provided with various sensors such as a crank angle sensor 11 and a water temperature sensor 12.

The crank angle sensor 11 sequentially detects the angle position of the crankshaft, which functions as the output axis for the engine 10.

The output from the crank angle sensor 11 is transmitted to the engine control unit 30.

The engine control unit 30 is capable of detecting the rotational speed of the crankshaft on the basis of the output from the crank angle sensor 11.

The water temperature sensor 12 detects the temperature of the engine 10 coolant.

The transmission 20 decreases/increases the rotational output of the engine 10 crankshaft and transfers drive power the front and rear axle differential through an AWD transfer. The transmission 20 is, for example, a chain type of continuously variable transmission (CVT) including a variator to which a chain is attached between a pair of pulleys.

The transmission 20 is provided with various sensors such as a rotation sensor 21 and an oil temperature sensor 22.

The rotation sensor 21 is a group of multiple sensors each detecting the rotational speed at various sites of the transmission 20 such as the input and output axes and the main unit.

The oil temperature sensor 22 is a sensor provided with a thermistor to detect the oil temperature of the CVT fluid, which functions as the hydraulic fluid and the lubricant for the transmission 20.

The engine control unit 30 centrally controls the engine 10 and its auxiliary devices. The engine control unit 30 is configured with an information processing device such as a CPU, a storage device such as RAM or ROM, an input/output interface, and a bus connecting these components.

The engine control unit 30 is also capable of transmitting various information such as the coolant temperature of the engine 10, the rotation speed of the crankshaft, and the output torque to the transmission control unit 40 using a vehicle LAN device such as a CAN communication system, for example.

The transmission control unit 40 centrally controls the transmission 20 and its auxiliary devices. The transmission control unit 40 is configured with an information processing device such as a CPU, a storage device such as RAM or ROM, an input/output interface, and a bus connecting these components.

The transmission control unit 40 performs shift control of the transmission 20, lockup control, and clamping force control of the AWD transfer, etc.

The transmission control unit 40 also functions as a malfunction diagnostic device that diagnoses malfunctions in which the output voltage from the oil temperature sensor 22 is offset toward a low temperature or a high temperature in regards to the voltage that is normally obtained at a given temperature.

Hereafter, this malfunction diagnostic function will be described in detail. When there is a failure in the oil temperature sensor 22 or its wiring causing contact resistance to be applied either in series or in parallel to the thermistor, the output voltage from the oil temperature sensor 22 is offset toward a low temperature or a high temperature but within the normal range thus causing an offset malfunction.

Figure 2A:
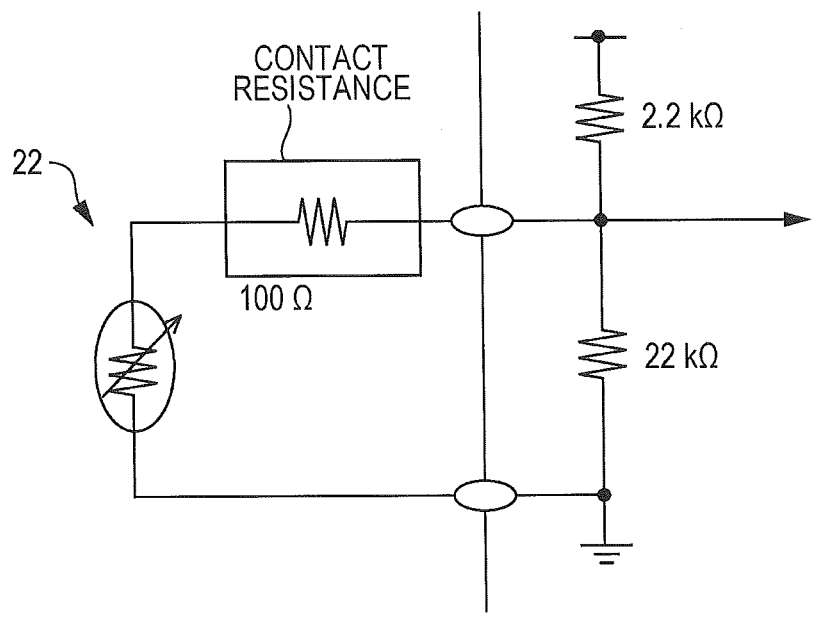
FIGS. 2A and 2B are circuit diagrams illustrating models of a malfunction state in which contact resistance is applied to an oil temperature sensor.
Figure 2B:
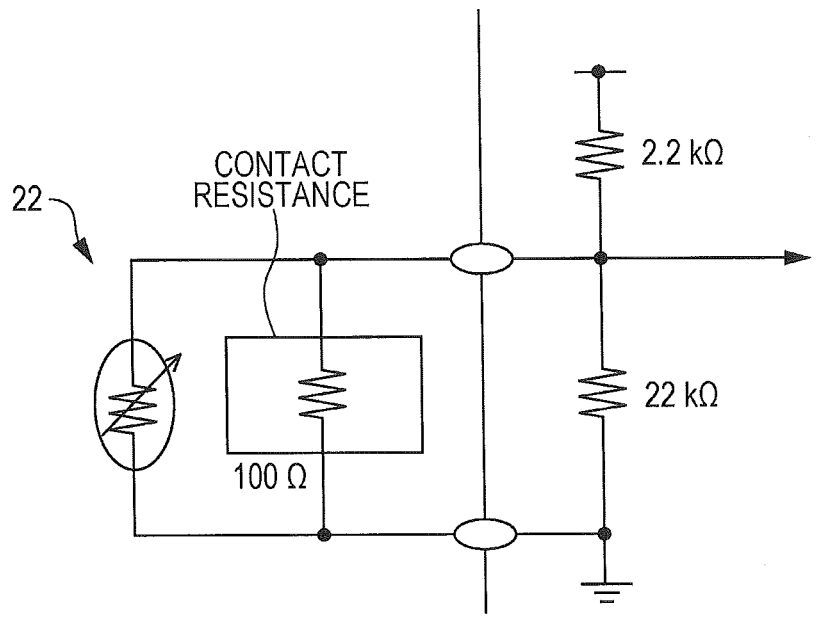

FIGS. 2A and 2B are circuit diagrams illustrating models of a malfunction state in which contact resistance is applied to an oil temperature sensor. FIG. 2A illustrates a low temperature offset malfunction when contact resistance is applied in series, and FIG. 2B illustrates a high temperature offset malfunction when contact resistance is applied in parallel.

As illustrated in FIGS. 2A and 2B, the oil temperature sensor 22 is provided with a 2.2 kΩ pull-up resistor and a 22 kΩ pull-down resistor.

The oil temperature sensor 22 operates within a range of −50 to 150° C. The maximum tolerance value for the resistance value at −50° C. is 89.1 kΩ, and the minimum tolerance value at 150° C. is 0.100 kΩ.

When the connector contact connecting to the output wiring of the oil temperature sensor 22 becomes worn due to vibration and so on for example, this results in a state similar to when contact resistance is applied in series, as illustrated in FIG. 2A.

If a contact resistance between 1 and 1000 kΩ is applied in series to the sensor for example, the temperature detected by the sensor will be offset between 41.9° C. to −46° C. when the actual temperature is between −50° C. to 150° C.

The other situation as illustrated in FIG. 2B such as a metal piece of the chassis or some other metal part making contact results in a state similar to when contact resistance is applied in parallel.

For example, if a contact resistance between 0.01 to 0.2 kΩ is applied to the sensor in parallel, the temperature detected by the sensor will be offset between 97.4° C. to 150° C. when the actual temperature is between −50° C. to 150° C.

As these detection values (temperatures) themselves are within the normal range of values output from the oil temperature sensor 22 when operating without malfunction, it is extremely difficult to determine these kinds of malfunctions based only on the output voltage, for example.

According to the first example, the transmission control unit 40 functions as a diagnostic device to determine the low temperature offset malfunctions and the high temperature offset malfunctions as described above.

Hereafter, the method for diagnosing malfunctions will be described. First, the diagnosis of the low temperature offset malfunction will be described.

FIG. 3 is a flowchart illustrating a method for diagnosing low temperature offset malfunctions regarding the diagnostic device for a temperature sensor according to the first example.

This method will be described hereafter in order of each step in the process.

Step S01: Determination of Oil Temperature Sensor Voltage

The transmission control unit 40 determines whether or not the output voltage of the oil temperature sensor 22 is within a predetermined range previously set according to assumed normal operating conditions.

When the voltage of the oil temperature sensor 22 is within the predetermined range, the process proceeds to step S02, and for all other cases, the series of processes terminates (returns).

Step S02: Determination of Engine Coolant Temperature

The transmission control unit 40 determines whether or not the coolant temperature for the engine 10 is at or above a predetermined value previously set according the assumed state after warm-up, based on information from the engine control unit 30.

When the coolant temperature is at or above the predetermined value, the process proceeds to step S03, and for all other cases, the series of processes terminates (returns).

Step S03: Determination of Engine Heat Amount Accumulation Time

The transmission control unit 40 determines whether or not the engine heat amount accumulation time, which is the elapsed time in which the engine is in a predetermined state of heat generation, is at or above a predetermined value.

The engine heat amount accumulation time will be described in detail later.

When the engine heat amount accumulation time is at or above the predetermined value, it is determined that warm-up is finished with the process continuing to step S04, and for all other cases, the series of processes terminates (returns).

Step S04: Determination of Oil Temperature Low Temperature Threshold

The transmission control unit 40 determines whether or not the detected oil temperature (detection value) calculated on the basis of the output voltage from the oil temperature sensor 22 is at or below the low temperature threshold previously set.

When the detected oil temperature is at or below the low temperature threshold, the process proceeds to step S05, and for all other cases, the series of processes terminates (returns).

Step S05: Determination of Low Temperature Offset Malfunction

The transmission control unit 40 makes the determination that a low temperature offset malfunction has occurred in the oil temperature sensor 22, and the series of processes terminates (returns).

When the low temperature offset malfunction is determined, a predetermined process is performed such as turning on a warning lamp (MIL) or a switching of control to a failsafe mode.

FIG. 4 is a flowchart illustrating a method for counting the engine heat amount accumulation time previously described.

Hereafter the process will be described in order of each step.

Step S11: Determination of Ignition being on

The transmission control unit 40 determines whether or not the ignition switch is in the on state on the basis of information from the engine control unit 30.

When the ignition switch is on, the process proceeds to step S12, and for all other cases, proceeds to step S19.

Step S12: Determination of Engine Coolant Temperature and Predetermined Value A

The transmission control unit 40 determines whether or not the coolant temperature for the engine 10 is at or above a predetermined value A previously set according to the assumed engine coolant state (40° C., for example) on the basis of information from the engine control unit 30.

When the coolant temperature is at or above the predetermined value A, the process proceeds to step S13, and for all other cases, proceeds to step S19.

Step S13: Determination of Engine Coolant Temperature and Predetermined Value B

The transmission control unit 40 determines whether or not the coolant temperature for the engine 10 is a predetermined value B previously set according to the assumed state after warm-up (the predetermined value B is greater than the predetermined value A, and is 90° C., for example) on the basis of information from the engine control unit 30.

When the coolant temperature is at or above the predetermined value B, the process proceeds to step S14, and in all other cases, the series of processes terminates (returns).

Step S14: Determination of Engine Rotation Speed

The transmission control unit 40 determines whether or not the rotation speed of the crankshaft of the engine 10 is at or below a predetermined value previously set, based on the information from the engine control unit 30.

When the rotation speed is at or below the predetermined value, the process proceeds to step S15, for all other cases, the series of processes terminates (returns).

Step S15: Determination of Fuel Cut

The transmission control unit 40 determines whether or not the engine 10 is in a fuel cut state in which fuel is not injected in all cylinders, based on information from the engine control unit 30.

When fuel is normally being injected in the engine 10, the process proceeds to step S16, and if in a fuel cut state, the series of processes terminates (returns).

Step S16: Determination of Estimated Engine Heat Amount

The transmission control unit 40 determines whether or not the estimated value for the amount of engine heat, which is the estimated amount of heat generated by the engine 10, is at or above a predetermined value previously set, on the basis of information from the engine control unit 30.

The estimated value for the amount of engine heat is obtained with the following Expression 1, for example. The estimated value for the amount of engine heat kW=|engine output kW−acceleration resistance kW−air resistance kW−rolling resistance kW|−wind-chill heat amount kW . . . (Expression 1)

The engine output is obtained with the following Expression 2. The engine output kW=engine torque Nm×engine rotation speed rpm×2π rad/60 sec/1000 . . . (Expression 2)

The acceleration resistance is obtained with the following Expression 3. The acceleration resistance kW=vehicle weight kg×vehicle acceleration m/s²×vehicle speed km/h× 1000 m/60 min/60 sec/1000 . . . (Expression 3)

The air resistance is obtained with the following Expression 4. The air resistance kW=air resistance coefficient×air density kg/m³×frontal projected area m²×(vehicle speed km/h×1000 m/60 min/60 sec) 3/2/1000 . . . (Expression 4)

The rolling resistance is obtained with the following Expression 5. The rolling resistance kW=rolling resistance coefficient×vehicle weight kg/9.8 m/s²×vehicle speed km/h× 1000 m/60 min/60 sec/1000 . . . (Expression 5)

The wind-chill heat amount is obtained with the following Expression 6. The wind-chill heat amount kW=vehicle speed→heat amount conversion coefficient kW/s·m×vehicle speed km/h×1000 m/60 min/60 sec/1000 . . . (Expression 6)

When the estimated value for amount of engine heat is at or above the predetermined value, the process proceeds to step S17, and for all other cases, the series of processes terminates (returns).

Step S17: Determination of Vehicle Speed

The transmission control unit 40 determines whether or not the vehicle driving speed detected on the basis of output from the rotation sensor 21, etc. is within a predetermined range between a upper limit value and a lower limit value that are previously set.

When the vehicle speed is within the predetermined range, it is determined that the vehicle is being driven normally with the process continuing to step S18, and for all other cases, the series of processes terminates (returns).

Step S18: Counting the Engine Heat Amount Accumulation Time

The transmission control unit 40 counts the count value of the engine heat amount accumulation time, and the series of processes terminates (returns).

Step S19: Resetting the Engine Heat Amount Accumulation Time

The transmission control unit 40 resets the count value of the engine heat amount accumulation time to zero, and the series of processes terminates (returns).

Next, the diagnosis of the high temperature offset malfunction will be described.

Figure 5:
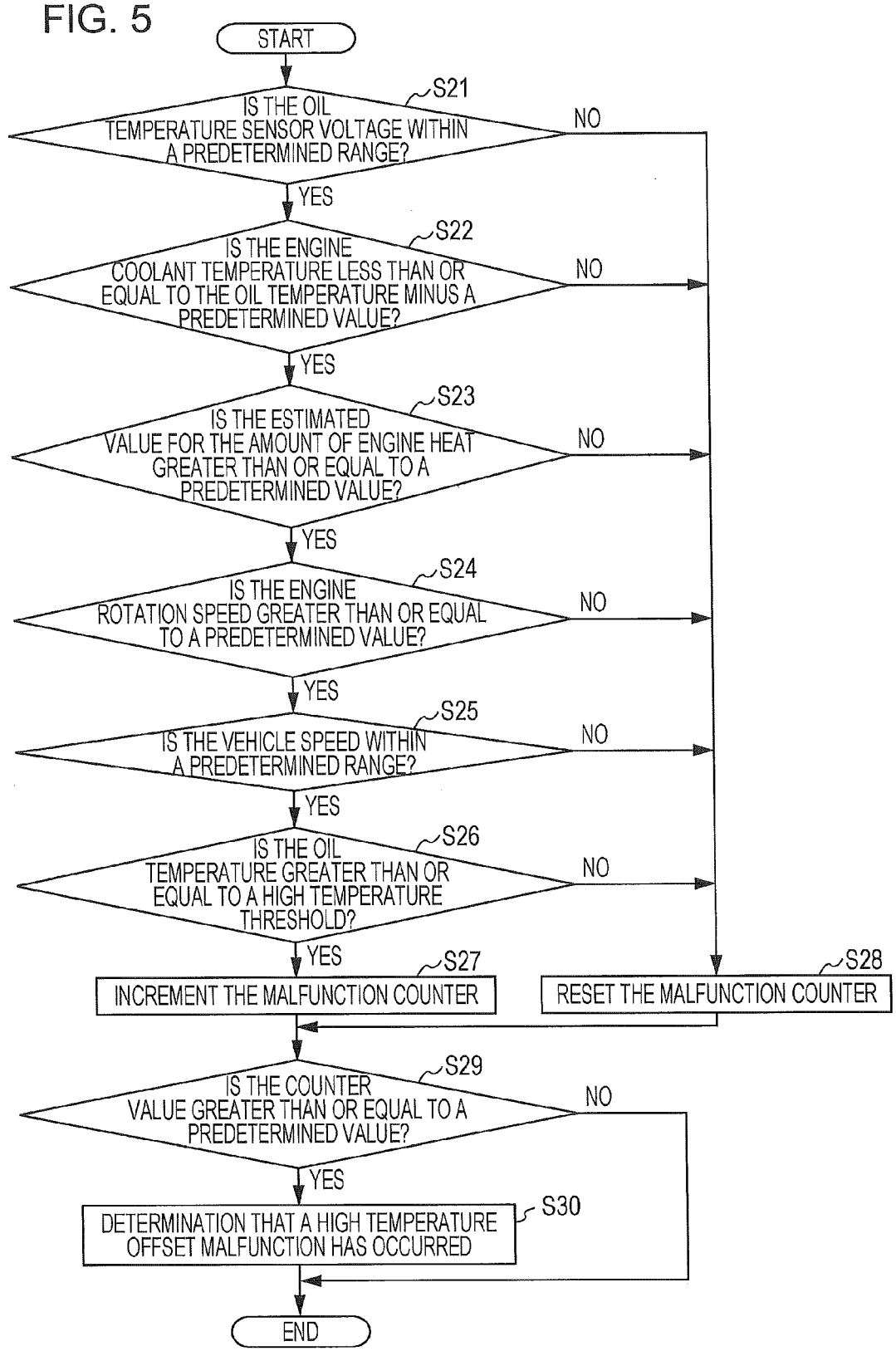
FIG. 5 is a flowchart illustrating a method for diagnosing high temperature offset malfunctions regarding the diagnostic device for a temperature sensor according to the first example.

FIG. 5 is a flowchart illustrating a method for diagnosing the high temperature offset malfunctions regarding the diagnostic device for a temperature sensor according to the first example.

This method will be described hereafter in order of each step in the process.

Step S21: Determination of Oil Pressure Sensor Voltage

The transmission control unit 40 determines whether or not the output voltage of the oil temperature sensor 22 is within a predetermined range previously set according to assumed normal operating conditions.

When the voltage of the oil temperature sensor 22 is within the predetermined range, the process proceeds to step S22, and for all other cases, proceeds to step S28.

Step S22: Determination of Engine Coolant Temperature

The transmission control unit 40 determines whether or not the coolant temperature for the engine 10 is at or below a value less than the predetermined value previously set from the oil temperature detected by the oil temperature sensor 22, on the basis of information from the engine control unit 30.

When the coolant temperature is at or below the value less than the predetermined value from the oil temperature, the process proceeds to step S23, and for all other cases, proceeds to step S28.

Step S23: Determination of Estimated Value for the Amount of Engine Heat

The transmission control unit 40 determines whether or not the estimated value for the amount of engine heat, which is the estimated amount of heat generated by the engine 10, is at or above a predetermined value previously set, based on information from the engine control unit 30.

The method for calculating the estimated value for the amount of engine heat is similar that described regarding step S16 described earlier.

When the estimated value for the amount of engine heat is at or below the predetermined value, it is determined that the operating state of the engine 10 is not in a high heat generation state (high output state) and the process proceeds to step S24, and for all other cases, proceeds to step S28.

Step S24: Determination of Engine Rotation Speed

The transmission control unit 40 determines whether or not the rotation speed of the crankshaft of the engine 10 is at or above a predetermined value previously set, on the basis of information from the engine control unit 30.

When the rotation speed is at or above the predetermined value, the process proceeds to step S25, and for all other cases, proceeds to step S28.

Step S25: Determination of Vehicle Speed

The transmission control unit 40 determines whether or not the vehicle driving speed detected on the basis of the output from the rotation sensor 21, etc. is within a predetermined range between a previously set upper limit value and a lower limit value.

When the vehicle speed is within the predetermined range, the process proceeds to step S26, and for all other cases, proceeds to step S28.

Step S26: Determination of Oil Temperature High Temperature Threshold

The transmission control unit 40 determines whether or not the detected oil temperature based on the output voltage from the oil temperature sensor 22 is at or above a high temperature threshold previously set.

When the detected oil temperature is at or above the high temperature threshold, the process proceeds to step S27, and for all other cases, proceeds to step S28.

Step S27: Counting the Malfunction Counter

The transmission control unit 40 counts the count value of the malfunction counter storing the count value representing the elapsed time of the state in which a malfunction is suspected. Afterwards, the process proceeds to step S29.

Step S28: Resetting the Malfunction Counter

The transmission control unit 40 resets the count value of the malfunction counter described earlier to zero. Afterwards, the process proceeds to step S29.

Step S29: Determination of Malfunction Counter Value

The transmission control unit 40 determines whether or not the counter value of the malfunction counter is at or above a predetermined value previously set.

When the counter value is at or above the predetermined value, the process proceeds to step S30, and for all other cases, the series of processes terminates (returns).

Step S30: Determination of High Temperature Offset Malfunction

The transmission control unit 40 makes the determination that a high temperature offset malfunction has occurred in the oil temperature sensor 22, and the series of processes terminates (returns).

When the high temperature offset malfunction is determined, a predetermined process is performed such as turning on a warning lamp (MIL) or a switching of control to a failsafe mode.

The diagnosis of the low temperature offset malfunction and the high temperature offset malfunction described above are not be performed when there is a system error in CAN communication, a malfunction with the water temperature sensor 12, when the engine MIL lamp is on, or some other abnormalities.

According to the first example described above, the following advantages may be obtained.

(1) Malfunctions in which the detection values are offset towards low temperatures may be suitably detected even when the actual output from the temperature sensor is within the normal range, by determining a low temperature offset malfunction in the case that the detection values from the oil temperature sensor 22 are at or below the predetermined low temperature threshold during a state in which the engine heat amount accumulation time, which is the elapsed time in which the engine is in a predetermined state of generating heat, is at or above a predetermined value, and warm-up is sufficiently complete.

(2) Malfunctions in which the detection values are offset towards high temperatures may be suitably detected even when the actual output from the temperature sensor is within the normal range, by determining a high temperature offset malfunction in the case that the engine heat amount is relatively low but the elapsed time of the state in which the detected oil temperature is at or above the high temperature threshold.

Second Example

Next, the diagnostic device for a temperature sensor according to a second example of the present technology will be described.

In the second example, the portions that are substantially similar to those in the first example are denoted by like reference numerals, and descriptions thereof are omitted. Mainly the differences will be described.

In the second example as well, the transmission control unit 40 functions as the diagnostic device to determine the low temperature offset malfunctions and the high temperature offset malfunctions previously described regarding the first example.

Hereafter, the method for diagnosing malfunctions according to the second example will be described. Each type of diagnosis described hereafter is not executed when the output voltage from the oil temperature sensor 22 is outside the normal range previously set, when an error has occurred in the communication system such as a CAN communication system or in any ECU, when there is a malfunction with the water temperature sensor 12, or when an engine malfunction warning is triggered.

Figure 6:
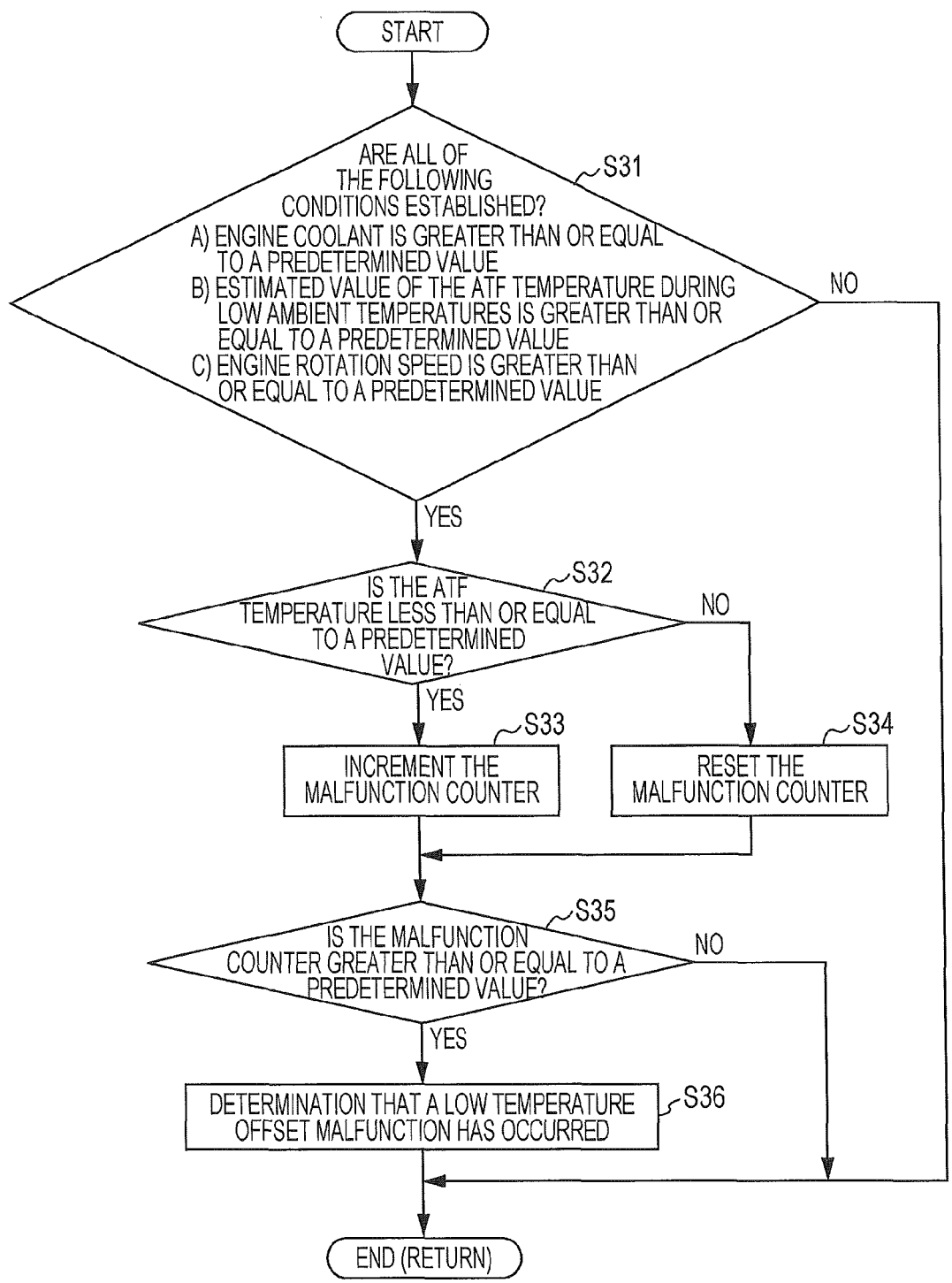
FIG. 6 is a flowchart illustrating a method for diagnosing low temperature offset malfunctions regarding the diagnostic device for a temperature sensor according to a second example.

First, the diagnosis of the low temperature offset malfunction will be described. FIG. 6 is a flowchart illustrating a method for diagnosing low temperature offset malfunctions regarding the diagnostic device for a temperature sensor according to the second example.

Hereafter, the process will be described in order of each step.

Step S31: Determination of Diagnostic Execution Conditions

The transmission control unit 40 determines whether or not all of the conditions A through C described below are satisfied, proceeding to step S32 when all are satisfied, and terminating (return) the series of processes when even one of these are not satisfied.

Condition A: the engine coolant temperature is greater than or equal to a predetermined value (for example, 80° C.)

Condition B: an estimated value of an automatic transmission fluid (ATF) temperature during low ambient temperatures is greater than or equal to a predetermined value (for example, 10° C.)

Condition C: the engine rotation speed is greater than or equal to a predetermined value (for example, 500 rpm).

That is to say, the diagnosis of the low temperature offset malfunction is performed after the engine warm-up is complete.

Here, the estimated value of the ATF temperature during low ambient temperatures is the estimated temperature calculated on the basis of the driving state history of the vehicle during low temperature environments (for example, an ambient temperature of −40° C.)

The transmission control unit 40 also functions as the low ambient temperature temperature-estimating unit of the present invention by calculating the estimated value of the ATF temperature during low ambient temperatures.

Hereafter, the method for calculating the estimated value of the ATF temperature during low ambient temperatures will be described.

The estimated value of the ATF temperature during low ambient temperatures is calculated consecutively every 10 msec, for example.

First, the estimated value of the ATF temperature during low ambient temperatures is obtained by Expression 7 when it is determined that operation has initiated.

The estimated value of the ATF temperature during low ambient temperatures ° C.=ATF oil temperature ° C. . . . (Expression 7)

The estimated value of the ATF temperature during low ambient temperatures is obtained by Expression 8 for cases other than when it is determined that operation has initiated.

The estimated value of the ATF temperature during low ambient temperatures ° C.=estimated value for the amount of engine heat (low temperature) kW×heat amount temperature conversion coefficient (low temperature) . . . (Expression 8)

Here, the heat amount temperature conversion coefficient (low temperature) is 0.005° C./kW, for example.

It is determined that operation has initiated when the ignition switch changed from the off state to the on state, and it is not determined that operation has initiated when the engine rotation speed is at least 500 rpm for at least one second. For all other cases, the previous determination result is stored.

An engine heat amount cumulative value (low temperature) is obtained by Expression 9.

The engine heat amount cumulative value (low temperature) n kW=the engine heat amount cumulative value (low temperature) n−1 kW+the engine heat amount (low temperature) kW/s×0.01 . . . (Expression 9)

The engine heat amount (low temperature) is obtained by Expression 10.

The engine heat amount (low temperature) kW/s=engine power loss kW/s+ATF warmer heat amount (low temperature) kW/s−vehicle speed wind-chill heat amount (low temperature) kW/s . . . (Expression 10)

The ATF warmer heat amount (low temperature) is obtained by Expression 11.

The ATF warmer heat amount (low temperature)=ATF warmer heat amount table value (ATF warmer flow amount) kW/s×engine coolant temperature ° C.−estimated value of the ATF temperature during low ambient temperatures n−1/(oil temperature when evaluating ATF warmer properties ° C.−engine coolant temperature when evaluating ATF warmer properties ° C.×ATF warmer heat amount (low temperature) correction coefficient (1.0) . . . (Expression 11)

The ATF warmer flow amount is obtained by Expression 12.

The ATF warmer flow amount L/min=ATF warmer flow amount table value (engine rotation speed) . . . (Expression 12)

The following parameters are set according to the ATF warmer property table:

ATF warmer heat amount table value (ATF warmer flow amount);

ATF flow amount table value;

Oil temperature when evaluating ATF properties (for example, 120° C.); and

Engine coolant temperature when evaluating ATF properties (for example, 80° C.)

The vehicle speed wind-chill heat amount (low temperature) is obtained by Expression 13.

The vehicle speed wind-chill heat amount (low temperature) kW/s=vehicle speed km/h×1000 m/km/60 min/h/60 min/s×port area m²×specific heat of air J/kg/K×air density kg/m³×(estimated value of the ATF temperature during low ambient temperatures n−1° C.−ambient temperature during low ambient temperatures ° C.)×vehicle speed wind-chill heat amount (low temperature) correction coefficient/1000 . . . (Expression 13)

The following parameters are set accordingly:

Specific heat of air=1030 J/kg/K (humidity 100%);

Air density=1.293 kg/m³ (0° C., 1atm);

Ambient temperature during low ambient temperatures=−40° C.;

Port area=1.0 m²; and

Vehicle speed wind-chill heat amount (low temperature) correction coefficient=0.0101

The vehicle speed wind-chill heat amount (high temperature) correction coefficient used to calculate the estimated value of the ATF temperature during high temperatures is 0.025, for example.

The engine power loss is obtained by Expression 14.

The engine power loss kW/s=engine horsepower kW/s−driving resistance power kW/s . . . (Expression 14)

A lower limiter processing is performed to ensure that the engine power loss has a value of at least zero.

The engine horsepower is obtained by Expression 15.

The engine horsepower kW/s=engine torque N·m×engine rotation speed rpm×2π/60 s/min/1000 . . . (Expression 15)

Using Expression 16, the variation in the estimated value of the engine torque during engine warm-up is corrected by the torque converter properties.

Engine torque N·m≤estimated value of engine torque according to the torque converter properties N·m . . . (Expression 16)

The estimated value of engine torque according to the torque converter properties is obtained by Expression 17.

The estimated value of engine torque according to the torque converter properties N·m=engine rotation speed rpm2×torque converter volume coefficient table value (torque converter speed ratio) N·m/rpm² . . . (Expression 17)

The torque converter speed ratio is obtained by Expression 18.

The torque converter speed ratio=output rotation speed rpm/input rotation speed rpm . . . (Expression 18)

The driving resistance power is obtained by Expression 19.

The driving resistance power kW/s=inertia acceleration resistance power kW/s+air resistance power kW/s+rolling resistance power kW/s . . . (Expression 19)

The inertia acceleration resistance power is obtained by Expression 20.

The inertia acceleration resistance power kW/s=inertia resistance power kW/s+acceleration resistance power kW/s . . . (Expression 20)

The inertia resistance power is obtained by Expression 21.

The inertia resistance power kW/s=engine inertia resistance power kW/s+primary pulley inertia resistance power kW/s . . . (Expression 21)

The engine inertia resistance power is obtained by Expression 22.

The engine inertia resistance power kW/s=engine inertia resistance N·m×engine rotation speed rpm×2π/60 s/min/1000 . . . (Expression 22)

The engine inertia resistance is obtained by Expression 23.

The engine inertia resistance N·m=engine rotation acceleration rpm/s×2π/60 s/min×engine inertia resistance coefficient kg·m·s$^2$×9.8 m/s$^2$ . . . (Expression 23)

The engine inertia resistance coefficient is the sum of the engine crank axis inertia resistance coefficient and the torque converter input inertia resistance coefficient, and is 0.011661 kg·m·s$^2$ as an example.

The primary pulley inertia resistance power is obtained by Expression 24.

The primary pulley inertia resistance power kW/s=primary pulley inertia resistance N·m×primary pulley resistance rotation speed rpm×2π/60 s/min/1000 . . . (Expression 24)

The primary pulley inertia resistance is obtained by Expression 25.

The primary pulley inertia resistance N·m=primary pulley rotation acceleration rpm/s×2π/60 s/min×primary pulley inertia resistance coefficient kg·m·s$^2$×9.8 m/s$^2$ . . . (Expression 25)

The primary pulley inertia resistance coefficient is the sum of the primary pulley axis inertia resistance coefficient, the torque converter output inertia resistance coefficient, and the FR clutch inertia resistance coefficient, and is 0.0442 kg·m·s$^2$ as an example.

The acceleration resistance power is obtained by Expression 26.

The acceleration resistance power kW/s=vehicle weight kg×vehicle acceleration m/s$^2$×vehicle speed km/h×1000 m/km/60 sec/min/60 sec/1000 . . . (Expression 26)

A lower limit limiter processing is performed to ensure than the vehicle acceleration m/s$^2$ is greater than or equal to −0.5 m/s$^2$.

The lower limit limiter processing described above is performed so that the energy consumed by brake pads during braking is not added to the heat amount, as the vehicle acceleration is −0.5 m/s$^2$ or lower during braking.

The air resistance power is obtained by Expression 27.

The air resistance power kW/s=air resistance coefficient× air density kg/m$^3$×frontal projected area m$^2$×(vehicle speed km/h×1000 m/km/60 sec/min/60 sec)$^3$/1000 . . . (Expression 27)

These parameters are different for each vehicle type, but the following values serve as an example:

Air resistance coefficient=0.306;
Air density=1.293 kg/m$^3$; and
Frontal projected area=2.29 m$^2$ The rolling resistance power is obtained by Expression 28.

The rolling resistance power kW/s=rolling resistance coefficient×vehicle weight kg/9.8 m/s$^2$×vehicle speed km/h×1000 m/km/60 min/h/60 sec/min/1000 . . . (Expression 28)

These parameters are different for each vehicle type, but the following serves as an example:

Rolling resistance coefficient=0.04 (typical paved road); and
Vehicle weight=1400 kg Step S32: Determination of ATF Temperature The transmission control unit 40 compares the detected value of the ATF temperature from the oil temperature sensor 22 with a predetermined value previously set (low temperature offset malfunction determination value, which is 20° C., for example), and proceeds to step S33 when the ATF temperature is at or below the predetermined value. For all other cases, the processing proceeds to step S34.

Step S33: Counting the Malfunction Counter

The transmission control unit 40 counts the count value of the malfunction counter which counts the elapsed time of the state in which the ATF temperature is at or below the predetermined value regarding step S32.

Afterwards, the processing proceeds to step S35.

Step S34: Resetting the Malfunction Counter to Zero

The transmission control unit 40 resets the count value of the malfunction counter to zero.

Afterwards, the processing proceeds to step S35.

Step S35: Determination of the Count Value of the Malfunction Counter

The transmission control unit 40 compares the count value of the malfunction counter with a predetermined value previously set (a value that corresponds to 60 seconds, for example).

The processing proceeds to step S36 when the count value of the malfunction counter is at or above the predetermined value, and for all other cases, the series of processes terminates (returns).

Step S36: Determination of Low Temperature Offset Malfunction

The transmission control unit 40 makes the determination that a low temperature offset malfunction has occurred in the oil temperature sensor 22, and the series of processes terminates.

Next, the diagnosis of the high temperature offset malfunction will be described.

FIG. 7 is a flowchart illustrating a method for diagnosing the high temperature offset malfunctions regarding the diagnostic device for a temperature sensor according to the second example.

Hereafter, the process will be described in order for each step.

Step S41: Determination of Diagnostic Execution Conditions

The transmission control unit 40 determines whether or not both of the conditions A and B described below are satisfied, proceeding to step S42 when both are satisfied, and terminating (return) the series of processes when even one of these are not satisfied.

Condition A: the engine coolant temperature is less than or equal to a predetermined value (for example, 80° C.)

Condition B: the engine rotation speed is greater than or equal to a predetermined value (for example, 500 rpm).

That is to say, the diagnosis of the high temperature offset malfunction is performed before the engine warm-up is complete.

Step S42: Determination of ATF Temperature

The transmission control unit 40 determines whether or not both of the conditions A and B described below are satisfied, proceeding to step S43 when both are satisfied, and proceeding to step S44 for all other cases.

Condition A: the ATF temperature is greater than or equal to a predetermined value (for example, 80° C.)

Condition B: the ATF temperature is greater than or equal to the estimated value of the ATF temperature during high ambient temperatures plus a predetermined value (for example, 5° C.)

The predetermined value regarding condition B is set to prevent misdiagnosis during times of increased ATF temperatures when driving under heavy load conditions.

Here, the estimated value of the ATF temperature during high ambient temperatures is the estimated temperature calculated on the basis of the driving state history of the vehicle during high temperature environments (for example, an ambient temperature of 40° C.)

The transmission control unit 40 also functions as the high ambient temperature temperature-estimating unit of the present invention by calculating the estimated value of the ATF temperature during high ambient temperatures.

The estimated value of the ATF temperature during high ambient temperatures is calculated substantially in the same way as the estimated value of the ATF temperature during low ambient temperatures described earlier, other than replacing the low ambient temperature of −40° C. with the high ambient temperature of 40° C.

Step S43: Counting the Malfunction Counter

The transmission control unit 40 counts the count value of the malfunction counter which counts the elapsed time of the state in which both of the conditions A and B regarding step S42 are satisfied.

Afterwards, the processing proceeds to step S45.

Step S44: Resetting the Malfunction Counter to Zero

The transmission control unit 40 resets the count value of the malfunction counter to zero.

Afterwards, the processing proceeds to step S45.

Step S45: Determination of the Count Value of the Malfunction Counter

The transmission control unit 40 compares the count value of the malfunction counter with a predetermined value previously set (a value that corresponds to 60 seconds, for example).

The processing proceeds to step S46 when the count value of the malfunction counter is at or above the predetermined value, and for all other cases, the series of processes terminates (returns).

Step S46: Determination of Low Temperature Offset Malfunction

The transmission control unit 40 determines that a high temperature offset malfunction has occurred in the oil temperature sensor 22, and the series of processes terminates.

According to the second example described above, the following advantages may be obtained.

(1) States in which detected values output by the oil temperature sensor 22 indicate abnormally low temperatures may be identified, and low temperature offset malfunctions may be suitably detected by determining a low temperature offset malfunction in the oil temperature sensor 22 in the case the estimated value of the ATF temperature during low ambient temperatures calculated by the transmission control unit 40 is at or above a predetermined value and the actual ATF temperature detected by the oil temperature sensor 22 is at or below the previously set low temperature offset malfunction determination value.

(2) The reliability of determinations may be improved by determining low temperature offset malfunctions when the state in which the actual value from the oil temperature sensor 22 is at or below the low temperature offset malfunction determination value continues for an elapsed time at or above a predetermined amount of time.

(3) States in which detected values output by the oil temperature sensor 22 indicate abnormally high temperatures may be identified, and high temperature offset malfunctions may be suitably detected by determining a high temperature offset malfunction in the oil temperature sensor 22 when the actual ATF temperature detected by the oil temperature sensor 22 is at or above a predetermined value and is at least 5° C. higher than the estimated value of the ATF temperature during high ambient temperatures calculated by the transmission control unit 40.

(4) The reliability of determinations may be improved by determining high temperature offset malfunctions when the state in which the actual value from the oil temperature sensor 22 is at or above a predetermined value and is at least 5° C. higher than the estimated value of the ATF temperature during high ambient temperatures continues for an elapsed time at or above a predetermined amount of time.

Modifications

The present technology is not limited to the examples described above, and thus various modifications and alterations are possible and within the technical scope of the present technology.

For example, the temperature sensor in the examples is an oil temperature sensor in a CVT, which increases and decreases the speed of the engine rotational output, but, the present technology is not limited thusly and may be used in the diagnosis of malfunctions in oil temperature sensors regarding manual transmissions, stepped automatic transmissions, dual clutch transmission, automated manual transmissions, and AWD transfers and differentials.

Also, the drive power source is not limited to engines, and may also be an electric motor or a hybrid system as a combination of an engine and an electric motor.

The invention claimed is:

1. A diagnostic device for a temperature sensor provided in a power transfer device that transfers drive power generated by a drive power source in a vehicle, the diagnostic device for the temperature sensor comprising:
   a warm-up state determining unit to determine whether or not the drive power source is in a predetermined warm-up completion state; and
   a low temperature offset malfunction determining unit to determine a low temperature offset malfunction in the temperature sensor when the warm-up state determining unit determines that the warm-up completion state is established, and a detected value from the temperature sensor is lower than a predetermined low temperature threshold,
   wherein the warm-up state determining unit determines the warm-up completion state according to an estimated heat amount from the drive power source based on at least one of an output from the drive power source, an acceleration resistance, an air resistance, a rolling resistance, and a wind-chill heat amount.

2. The diagnostic device for the temperature sensor according to claim 1, wherein the warm-up state determining unit determines the warm-up completion state when an accumulated time of the state in which the estimated heat amount from the drive power source is at or above a predetermined heat value is at or above a predetermined time value.

3. The diagnostic device for the temperature sensor according to claim 2, wherein the warm-up state determining unit is configured to calculate the accumulated time of the state in which the estimated heat amount is based on a rotational speed of the drive power source.

4. The diagnostic device for the temperature sensor according to claim 1, wherein the estimated heat amount from the drive power source is calculated based on the output from the drive power source, the acceleration resistance, the air resistance, the rolling resistance, and the wind-chill heat amount.

5. The diagnostic device for the temperature sensor according to claim 1, wherein the estimated heat amount from the drive power source is calculated based a difference between the output from the drive power source and each of the acceleration resistance, the air resistance, the rolling resistance, and the wind-chill heat amount.

6. A diagnostic device for a temperature sensor provided in a power transfer device that transfers drive power generated by a drive power source in a vehicle, the diagnostic device for the temperature sensor comprising:
- a low ambient temperature temperature-estimating unit to calculate an estimated temperature of a measured object under conditions of predetermined low temperatures; and
- a low temperature offset malfunction determining unit to determine a low temperature offset malfunction in the temperature sensor when the estimated temperature calculated by the low ambient temperature temperature-estimating unit is at or above a predetermined value, and an actual value of the measured object detected by the temperature sensor is at or below a previously set low temperature offset malfunction determination value,
- wherein the low temperature offset malfunction determining unit determines the low temperature offset malfunction according to an estimated heat amount from the drive power source based on at least one of an output from the drive power source, an acceleration resistance, an air resistance, a rolling resistance, and a wind-chill heat amount.

7. The diagnostic device for the temperature sensor according to claim 6, wherein the low temperature offset malfunction determining unit determines the low temperature offset malfunction when a state in which the actual value is at or below the low temperature offset malfunction determination value continues for at least a predetermined amount of time.

8. The diagnostic device for the temperature sensor according to claim 3, wherein the warm-up state determining unit is configured to calculate the accumulated time of the state in which the estimated heat amount is further based on the output from the drive power source, the acceleration resistance, the air resistance, the rolling resistance, and the wind-chill heat amount.

* * * * *